US006865939B2

(12) United States Patent
Kirby et al.

(10) Patent No.: US 6,865,939 B2
(45) Date of Patent: Mar. 15, 2005

(54) FLUORINATED SILICA MICROCHANNEL SURFACES

(75) Inventors: Brian J. Kirby, San Francisco, CA (US); Timothy Jon Shepodd, Livermore, CA (US)

(73) Assignee: Sandia Naitonal Laboratories, Livermore, CA (US)

( * ) Notice: Subject to any disclaimer, the term of this patent is extended or adjusted under 35 U.S.C. 154(b) by 116 days.

(21) Appl. No.: 10/245,224

(22) Filed: Sep. 16, 2002

(65) Prior Publication Data

US 2004/0052929 A1 Mar. 18, 2004

(51) Int. Cl.[7] ................................................ G01F 3/08
(52) U.S. Cl. ......................................................... 73/253
(58) Field of Search ................................ 428/375, 601; 96/1; 204/157.15, 450; 427/115; 73/253

(56) References Cited

U.S. PATENT DOCUMENTS 4,121,463 A * 10/1978 Argabrite .................... 374/206
5,726,247 A * 3/1998 Michalczyk et al. ........ 525/102
5,756,207 A * 5/1998 Clough et al. .............. 428/375
5,876,571 A * 3/1999 Buck ..................... 204/157.15
6,409,900 B1 * 6/2002 Parce et al. ................. 204/450
6,479,374 B1 * 11/2002 Ioka et al. .................. 438/601
6,727,182 B2 * 4/2004 Akahori et al. ............. 438/710

OTHER PUBLICATIONS

Gelest Inc. Product Bulletin, 2001.

* cited by examiner

*Primary Examiner*—Edward Lefkowitz
*Assistant Examiner*—Jewel V. Thompson
(74) *Attorney, Agent, or Firm*—Donald A. Nissen

(57) ABSTRACT

A method for surface modification of microchannels and capillaries. The method produces a chemically inert surface having a lowered surface free energy and improved frictional properties by attaching a fluorinated alkane group to the surface. The coating is produced by hydrolysis of a silane agent that is functionalized with either alkoxy or chloro ligands and an uncharged $C_3$–$C_{10}$ fluorinated alkane chain. It has been found that the extent of surface coverage can be controlled by controlling the contact time from a minimum of about 2 minutes to a maximum of 120 minutes for complete surface coverage.

21 Claims, 1 Drawing Sheet

FLUORINATED SILICA MICROCHANNEL SURFACES

STATEMENT OF GOVERNMENT INTEREST

This invention was made with Government support under contract no. DE-AC04-94AL85000 awarded by the U. S. Department of Energy to Sandia Corporation. The Government has certain rights in the invention.

CROSS-REFERENCE TO RELATED APPLICATIONS

Not applicable.

FIELD OF THE INVENTION

The present invention is directed to a method for reducing resistance to material movement in microchannels and capillaries, and especially in silica-based microchannels. The method provides for application of a chemically inert coating to the internal surfaces of these microchannels to produce a surface having a lowered surface free energy, thereby reducing frictional resistance between the microchannel wall and mobile components contained therein.

BACKGROUND OF THE INVENTION

Microvalves have been fabricated from monolithic polymer materials for use in controlling fluid flow in microfluidic systems. These microvalves are typically fabricated by photoinitiating phase-separated polymerization in specified regions of a three-dimensional microstructure that can be of glass, silicon, or plastic. The valve function is achieved by controlling the shape of the polymer monolith and by designing the monolith to move freely within microfluidic channels. Measurements of the pressure required to actuate these polymer microvalves clearly indicate that for smooth channel walls the force requirements are proportional to an effective friction coefficient between the polymer monolith and the channel walls. Consequently, reducing the coefficient of friction at the substrate or channel wall-polymer monolith interface can reduce actuation forces.

The coefficient of friction has two components that are a function of: 1) the deformation of the polymer monolith caused by small (typically μm-size) geometric irregularities in the channel wall; 2) intermolecular interactions between the channels walls and the surface of the polymer monolith. In the prior art, provision for intermolecular interactions was made by appropriate selection of charged moieties in both the mobile polymer monolith and channel wall modifications such that the polarity of charge in both these components was the same, thereby eliminating electrostatic interactions. However, selection of appropriate charged moieties can present fabrication difficulties and the prior art did not address changes in surface energy of uncharged species to effect reduction in the coefficient of friction between channel walls and the mobile polymer monolith. Moreover, there is no provision in prior art for reducing or eliminating deformation of the mobile polymer monolith. A comprehensive discussion related to the manufacture of monolithic polymer microvalves and their use in microfluidic systems is contained in prior co-pending application Ser. Nos. 09/695,816, filed Oct. 24, 2000 and 10/141,906 filed May, 09, 2002, incorporated herein by reference in their entirety.

SUMMARY OF THE INVENTION

Accordingly, the present invention is directed to methods for reducing resistance to material movement in microchannels. The method provides a precise and rapid protocol for modification of the microchannel surface to produce a surface having a programmably lowered surface free energy, thereby reducing the friction coefficient of the interface between the microchannel and mobile elements, fabricated therein, in a controllable manner. In particular, the method provides for modifying the surfaces of silica flow channels, by attaching an uncharged and chemically inert fluorinated alkane group to the surface. The fluorinated group is chemically similar in to Teflon® and shows similar low friction properties.

To achieve the surface coating of the invention, a silane agent functionalized with either alkoxy or chloro moieties and an uncharged $C_3$–$C_{10}$ fluorinated alkane chain is covalently bonded to the surface of a silica microchannel wall through hydrolysis and reaction of the alkoxy/chloro moieties with silanol groups on the silica surface. This leads to a covalent linkage of the silane group to the silica surface by up to three bonds. The fluorinated alkane group is thereby localized on the silica surface and is the group that comes into contact with mobile elements, such as a polymer monolith, contained in the microchannel.

DETAILED DESCRIPTION OF THE INVENTION

Figure 1:
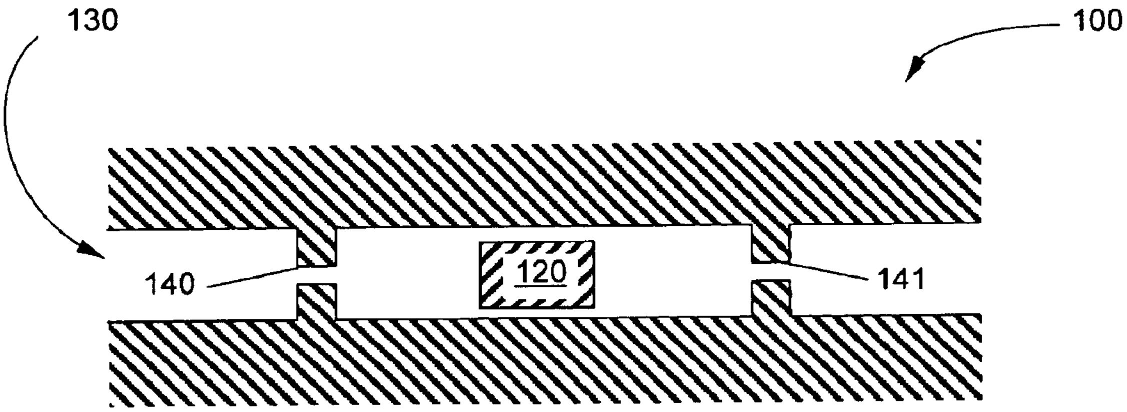
FIG. 1 is a schematic of a microvalve.

The invention will be illustrated by an example that describes a chemically inert fluorocarbon surface coating capable of reducing the surface energy of a microchannel wall and method for coating the surfaces of capillary or microchannel walls, generally. The examples below only serves to illustrate the invention and are not intended to be limiting. Modifications and variations may become apparent to those skilled in the art, however, these modifications and variations come within the scope of the appended claims. Only the scope and content of the claims limit the invention.

Throughout the written description of the invention the terms capillary and microchannel will be used interchangeably and refer generally to flow channels having at least one cross-sectional dimension in the range from about 0.1 μm to about 500 μm. The term "microfluidic" refers to a system or device composed of microchannels or capillaries.

In the present invention microchannel walls, i.e., the internal surfaces of a microchannel, are coated with a chemically inert and uncharged fluorocarbon coating by filling the microchannel with a chemical mixture, comprising an acid catalyst, a silane agent functionalized with either alkoxy or chloro moieties and an uncharged $C_3$–$C_{10}$ fluorinated alkane chain, water, and compatabilizing solvents for a prescribed incubation time, and at a prescribed temperature. The incubation time is in the range of from about 10 to 120 minutes at temperatures of from about 50–90° C. and preferably at 70° C. It has been found that the surfaces of silica microchannels can typically be completely coated in about 2 hrs at a temperature of 70° C. It can be desirable in certain applications to control the effects of the coating on zeta potential (surface charge), electroosmotic flow, and friction coefficient by controlling the extent of surface coating. This can be easily accomplished in the present invention by simply adjusting the incubation time.

EXAMPLE 1

A microchannel was filled with a solution of 1,4-dioxane, acetic acid, water and (tridecafluoro-1,1,2,2-tetrahydrooctyl) triethoxysilane. The solution was heated to 70° C. and remained in contact with the microchannel walls for about 2 hrs. The ethoxy groups undergo hydrolysis and react with the silanol (SiOH) groups on the silica microchannel wall to attach the fluorinated alkane to the microchannel wall. The fluorinated alkane projects from the silica wall and lowers the surface energy, and thus the frictional resistance of the channel wall. That coating the internal surface of a microchannel with a low friction coefficient fluorocarbon coating is effective in reducing wall friction is illustrated in the Example below.

EXAMPLE 2

A pair of devices similar in design to that shown in FIG. 1 was prepared. These devices 100 comprised a mobile monolithic polymer element 120 disposed within a microchannel 130, provided with first and second inlets and retaining means 140 and 141. The microchannel in one of devices 100 was coated with a fluorocarbon coating by the method described in example 1 above. Monolithic polymer elements were fabricated within each of the microchannels by methods such as those described in U.S. patent application Ser. Nos. 09/695,816 and 10/141,906 and conform to the shape of the microchannel.

Hydraulic pressure, applied by pressure means such as an HPLC pump or an electrokinetic pump (such as described in U.S. Pat. Nos. 6,013,164 and 6,019,882 to Paul and Rakestraw), to either end of element 120 caused polymer elements to move one direction or the other in response to the applied pressure. It was found in every case that the pressure required to actuate the polymer element within the fluorocarbon coated microchannel was anywhere from 2 to 8 times less than that needed to actuate the polymer element contained in the uncoated microchannel.

The performance of a number of microvalve architectures based on the use of a mobile polymer monolith is tied directly to the actuation pressure required to move a mobile polymer monolith. By way of example, the actuation time of an electrokinetic pump-actuated on/off microvalve is roughly proportional to the actuation pressure. Consequently, minimizing actuation pressure can increase the frequency response of such a system. The low-pressure breakthrough flow rate of current mobile polymer monolith check valve designs is proportional to actuation pressure. Thus, the pressure requirement of a controller system that employs mobile polymer monolith microvalves is minimized w hen actuation pressures are minimized.

Finally, in addition to being chemically inert and uncharged, these fluorocarbon coatings have a low surface energy so they do not adhere to most proteins. Consequently, these coating can facilitate microfluidic analysis and synthesis of proteins, including but not limited to protein and peptide separation, protein crystallization, and oligonucleotide/peptide synthesis.

While the invention has been illustrated by attaching fluorocarbon groups to microchannels having silica walls, the invention will work equally well with other substrates providing the walls contain hydroxyl (OH) groups. Attachment of the fluorocarbon in the example above was by ethoxy groups, however, any group such as methoxy, acetoxy, methoxyethoxy, methoxymethyl or halogens, preferably chloro, capable of reacting with hydroxy (silanol) groups in the microchannel wall, can be used.

We claim:

1. A method of coating the interior surface of a microchannel with a fluorocarbon coating, comprising:

contacting the microchannel walls with a chemical mixture comprising an acid catalyst and a fluorine functionalized silane agent in a solvent, wherein the chemical mixture is contacted with the microchannel walls for a predetermined period of time and at a fixed temperature to control the extent to which the walls are coated.

2. The method of claim 1, wherein the silane agent is functionalized with an uncharged fluorinated alkane and alkoxy or halogen ligands.

3. The method of claim 2, wherein the halogen ligands are chloro ligands.

4. The method of claim 2, wherein the uncharged fluorinated alkane is an uncharged $C_3$–$C_{10}$ fluorinated alkane chain.

5. The method of claim 2, wherein alkoxy is methoxy, ethoxy, acetoxy, methoxyethoxy or methoxymethyl.

6. The method of claim 1, wherein the silane agent is (tridecafluoro-1,1,2,2-tetrahydrooctyl) triethoxysilane.

7. The method of claim 1, wherein the period of time is in the range of from about 2 to about 120 minutes.

8. The method of claim 1, wherein the fixed temperature is a temperature in the range of from about 50 to 90° C.

9. The method of claim 8, wherein the temperature is about 70° C.

10. The method of claim 1, wherein the microchannel is a silica microchannel.

11. A device comprising a system of microchannels, wherein the interior surfaces of the microchannels are coated with the fluorocarbon coating of claim 1.

12. An improved device for controlling fluid flow in a microchannel in which a mobile, monolithic polymer element, made by polymerizing a monomer mixture within the microchannel, is disposed in the microchannel, and in which a displacing force controls the movement of the monolithic polymer element in the microchannel, wherein the improvement comprises coating the interior surface of the microchannel with the fluorocarbon coating of claim 1.

13. A method for controlling the surface energy of a microchannel, comprising:

introducing into the microchannel a chemical mixture comprising an acid catalyst and a fluorine functionalized silane agent in a solvent, wherein the chemical mixture is contacted with the microchannel walls for a predetermined period of time and at a fixed temperature to control the extent to which the walls are coated.

14. The method of claim 13, wherein the silane agent is functionalized with an uncharged fluorinated alkane and alkoxy or halogen ligands.

15. The method of claim 14, wherein the halogen ligands are chloro ligands.

16. The method of claim 14, wherein the uncharged fluorinated alkane is an uncharged $C_3$–$C_{10}$ fluorinated alkane chain.

17. The method of claim 14, wherein alkoxy is methoxy, ethoxy, acetoxy, methoxyethoxy or methoxymethyl.

18. The method of claim 13, wherein the silane agent is (tridecafluoro-1,1,2,2-tetrahydrooctyl) triethoxysilane.

19. The method of claim 13, wherein the period of time is in the range of from about 2 to about 120 minutes.

20. The method of claim 13, wherein the fixed temperature is a temperature in the range of from about 50 to 90° C.

21. The method of claim 20, wherein the temperature is about 70° C.

* * * * *